United States Patent
Eckel et al.

(10) Patent No.: US 12,137,162 B2
(45) Date of Patent: *Nov. 5, 2024

(54) KEY ENCRYPTION HANDLING

(71) Applicant: Lodestar Licensing Group, LLC, Boise, ID (US)

(72) Inventors: Nathan A. Eckel, Lucas, TX (US); Steven D. Check, Eden Prairie, MN (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/360,749

(22) Filed: Jun. 28, 2021

(65) Prior Publication Data

US 2021/0328790 A1  Oct. 21, 2021

Related U.S. Application Data

(63) Continuation of application No. 16/103,184, filed on Aug. 14, 2018, now Pat. No. 11,070,375.

(60) Provisional application No. 62/628,123, filed on Feb. 8, 2018.

(51) Int. Cl.
| | |
|---|---|
| *H04L 9/08* | (2006.01) |
| *G06F 12/0804* | (2016.01) |
| *G06F 21/74* | (2013.01) |
| *H04L 9/06* | (2006.01) |

(52) U.S. Cl.
CPC ........ *H04L 9/0894* (2013.01); *G06F 12/0804* (2013.01); *G06F 21/74* (2013.01); *H04L 9/0643* (2013.01); *H04L 9/0822* (2013.01); *H04L 9/0869* (2013.01); *G06F 2212/1032* (2013.01)

(58) Field of Classification Search
CPC ... H04L 9/0894; H04L 9/0643; H04L 9/0822; H04L 9/0869; H04L 9/14; H04L 2209/122; G06F 12/0804; G06F 21/74; G06F 21/572; G06F 2212/1032
See application file for complete search history.

(56) References Cited

U.S. PATENT DOCUMENTS

| | | | |
|---|---|---|---|
| 9,537,650 B2* | 1/2017 | Auradkar | ............. H04L 9/0833 |
| 11,070,375 B2 | 7/2021 | Eckel et al. | |
| 2006/0005049 A1 | 1/2006 | Randell | |

(Continued)

FOREIGN PATENT DOCUMENTS

| | | |
|---|---|---|
| CN | 1302013 A | 7/2001 |
| CN | 2560039 Y | 7/2003 |

(Continued)

OTHER PUBLICATIONS

"European Application Serial No. 19751937.4, Extended European Search Report mailed Oct. 1, 2021", 11 pgs.

(Continued)

*Primary Examiner* — Khoi V Le
(74) *Attorney, Agent, or Firm* — Fletcher Yoder, P.C.

(57) ABSTRACT

An apparatus comprises an encryption key generator to generate a media encryption key to encrypt data in number of memory components, where the encryption key generator is configured to wrap the media encryption key to generate an encrypted media encryption key, The encrypted media encryption key is stored in a non-volatile memory. The apparatus comprises firmware having instructions to transition the apparatus to and from a secure state using the encrypted media encryption key.

18 Claims, 8 Drawing Sheets

(56) References Cited

U.S. PATENT DOCUMENTS

| | | | |
|---|---|---|---|
| 2009/0110191 A1* | 4/2009 | Sanvido | H04L 9/0863 380/44 |
| 2011/0087890 A1 | 4/2011 | Munsil et al. | |
| 2011/0154023 A1* | 6/2011 | Smith | H04L 9/321 713/168 |
| 2011/0261964 A1* | 10/2011 | Kahler | H04L 9/083 380/44 |
| 2013/0028414 A1* | 1/2013 | Randell | H04W 12/041 380/44 |
| 2013/0236014 A1* | 9/2013 | Senese | H04W 12/037 380/278 |
| 2015/0242657 A1 | 8/2015 | Kim | |
| 2015/0341169 A1* | 11/2015 | Leppanen | H04W 12/037 380/44 |
| 2016/0011802 A1 | 1/2016 | Berke | |
| 2017/0372085 A1 | 12/2017 | Howe et al. | |
| 2019/0245689 A1 | 8/2019 | Eckel et al. | |

FOREIGN PATENT DOCUMENTS

| | | |
|---|---|---|
| CN | 105843776 A | 8/2016 |
| CN | 106445845 A | 2/2017 |
| CN | 111819562 | 10/2020 |
| TW | 201935304 A | 9/2019 |
| WO | WO-2011081738 A2 | 7/2011 |
| WO | 2019041272 | 3/2019 |
| WO | WO-2019156887 A1 | 8/2019 |

OTHER PUBLICATIONS

Kaplan, David, "AMD Memory Encryption", Advanced Micro Devices, Inc. All rights reserved. White Paper, (Apr. 21, 2016), 12 pgs.

First Office Action for CN Application No. 201980016725.0 dated Apr. 18, 2023.

"European Application Serial No. 19751937.4, Response filed Mar. 25, 2021 to Communication pursuant to Rules 161(2) and 162 EPC mailed Sep. 15, 2020", 14 pgs.

"International Application Serial No. PCT/US2019/016117, International Preliminary Report on Patentability mailed Aug. 20, 2020", 9 pgs.

"International Application Serial No. PCT/US2019/016117, International Search Report mailed May 15, 2019", 4 pgs.

"International Application Serial No. PCT/US2019/016117, Written Opinion mailed May 15, 2019", 7 pgs.

"Taiwanese Application Serial No. 108104258, Office Action mailed Jan. 7, 2020", w/ English Translation, 23 pgs.

"Taiwanese Application Serial No. 108104258, Office Action mailed Apr. 30, 2020", w/ English Translation, 23 pgs.

"Taiwanese Application Serial No. 108104258, Office Action mailed Dec. 16, 2020", w/ English translation, 17 pgs.

"Taiwanese Application Serial No. 108104258, Response filed Mar. 12, 2021 to Office Action mailed Dec. 16, 2020", w/ English Claims, 48 pgs.

"Taiwanese Application Serial No. 108104258, Response filed Apr. 1, 2020 to Office Action mailed Jan. 7, 2020", w/ English Claims, 59 pgs.

"Taiwanese Application Serial No. 108104258, Response filed Jul. 31, 2020 to Office Action mailed Apr. 30, 2020", w/ English Claims, 48 pgs.

European Patent Application No. 19751937.4, Communication Pursuant to Article 94(3) EPC dated Feb. 20, 2024, 8 pages.

* cited by examiner

| NVDRAM FUNCTION | UNOWNED | UNOWNED NEXTSTATE | UNSECURE | UNSECURE NEXTSTATE | SECURE_LOCKED | SECURE_LOCKED NEXTSTATE | SECURE_UNLOCKED | SECURE_UNLOCKED NEXTSTATE |
|---|---|---|---|---|---|---|---|---|
| INIT_KEYS | YES | SECURE_UNLOCKED | YES | SECURE_UNLOCKED | NO | N/A/N/A | NO | N/A/N/A |
| CHANGE_KEYS | NO | N/A | NO | N/A | YES | SECURE_UNLOCKED | YES | (LOCK) -> SECURE_UNLOCKED |
| UNSECURE | NO | N/A | YES | UNSECURE | YES | UNSECURE | YES | (LOCK) -> UNSECURE |
| UNLOCK | NO | N/A | NO | N/A | YES | SECURE_UNLOCKED | YES | SECURE_UNLOCKED |
| LOCK | NO | N/A | NO | N/A | YES | SECURE_LOCKED | YES | SECURE_LOCKED |
| ROTATE_ACCESS_KEYS | NO | N/A | NO | N/A | YES | SECURE_UNLOCKED | YES | (LOCK) -> SECURE_UNLOCKED |
| TEST_ACCESS_KEY | NO | N/A | NO | N/A | YES | SECURE_LOCKED | YES | SECURE_UNLOCKED |
| TEST_ERASE_KEY | NO | N/A | NO | N/A | YES | SECURE_LOCKED | YES | SECURE_UNLOCKED |
| SEV | NO | N/A | NO | N/A | NO | N/A | YES | SECURE_LOCKED |
| RESET / WDT | YES | UNOWNED | YES | UNSECURE | YES | SECURE_LOCKED | YES | SECURE_LOCKED |
| HOST CONTROLLER TIMEOUT | YES | UNOWNED | NO | N/A | NO | N/A | YES | SECURE_UNLOCKED |
| FACTORY DEFAULT | YES | UNOWNED | NO | N/A | NO | N/A | YES | UNOWNED |
| SAVE | YES | UNOWNED | NO | N/A | NO | N/A | YES | SECURE_UNLOCKED |
| RESTORE | YES | UNOWNED | NO | N/A | NO | N/A | YES | SECURE_UNLOCKED |
| ERASE | YES | UNOWNED | NO | N/A | NO | N/A | YES | SECURE_UNLOCKED |
| PATROL SCRUB | YES | UNOWNED | NO | N/A | YES | SECURE_LOCKED | YES | SECURE_UNLOCKED |
| FW UPDATE | YES | UNOWNED | NO | N/A | YES | SECURE_LOCKED | YES | SECURE_UNLOCKED |
| CHANGE SLOTS | YES | UNOWNED | NO | N/A | YES | SECURE_LOCKED | YES | SECURE_LOCKED |
| VENDOR LOG PAGE | YES | UNOWNED | YES | UNSECURE | YES | SECURE_LOCKED | YES | SECURE_UNLOCKED |
| HOST AREA | YES | UNOWNED | YES | UNSECURE | YES | SECURE_LOCKED | YES | SECURE_UNLOCKED |
| PAGE ACCESS | YES | UNOWNED | YES | UNSECURE | YES | SECURE_LOCKED | YES | SECURE_UNLOCKED |

FIG. 5

KEY ENCRYPTION HANDLING

PRIORITY APPLICATION

This application is a continuation of U.S. application Ser. No. 16/103,184, filed Aug. 14, 2018, which claims the benefit of priority to U.S. Provisional Application Ser. No. 62/628,123, filed Feb. 8, 2018, all of which are incorporated herein by reference in their entirety.

TECHNICAL FIELD

Embodiments of the disclosure relate generally to memory sub-systems, and more specifically, relate to managing a memory sub-system including key encryption handling with respect to encrypting data in the memory sub-system.

BACKGROUND

A memory sub-system can be a storage system, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 illustrates example device state function application program interfaces, in accordance with various embodiments.

DETAILED DESCRIPTION

Figure 1:
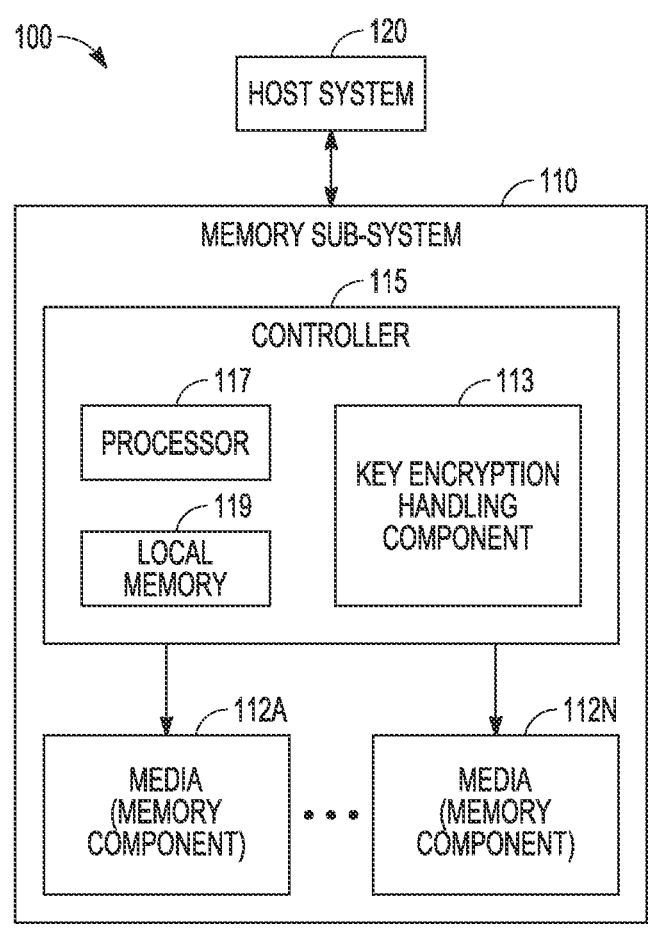
FIG. 1 illustrates an example computing environment that includes a memory sub-system, in accordance with various embodiments.

Aspects of the present disclosure are directed to managing a memory sub-system, which management includes key encryption handling with respect to encrypting data in the memory sub-system. Encryption is a security technique that converts data, programs, images, or other information into unreadable cipher. Such conversion can be performed using complex algorithms applied to the original content meant for encryption. An encryption key is a random string of bits created explicitly for scrambling and unscrambling data and is typically designed with algorithms intended to ensure that every key is unpredictable and unique. Key encryption, as discussed herein, includes encrypting an encryption key. A memory sub-system is also hereinafter referred to as a "memory device". An example of a memory sub-system is a storage system, such as a non-volatile dual in-line memory module (NVDIMM). In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

A NVDIMM is a type of random-access memory that has volatile memory for normal operation and non-volatile memory in which to dump the contents of the volatile memory if the power fails, using an on-board backup power source. NVDIMM-N is a dual in-line memory module (DIMM) with flash storage and traditional dynamic random-access memory (DRAM) on the same module. A host processing unit can access the traditional DRAM directly. In the event of a power failure, the NVDIMM-N copies the data from its volatile traditional DRAM to its persistent flash storage, and copies the data back to the volatile traditional DRAM, when power is restored. One type of NVDIMM-N is a NVRDIMM-N. NVRDIMM-N is a non-volatile registered dual-inline memory module (DIMM), which is a standard registered DIMM (RDIMM) targeted at enterprise class server systems. By registered, it is meant that registered memory modules (also called buffered memory modules) include a register between dynamic random-access memory (DRAM) modules and a respective system memory controller, where a DRAM module contains a number of DRAMS, which are volatile memories. The RDIMM uses a hardware register that buffers the control signals to the modules.

In an architecture for the NVRDIMM-N, a NAND memory, which is a persistent storage device named after the negative-and (NAND) logic form in which its basic memory cell is configured, is arranged with standard DRAMs. Since a DRAM is volatile, when the power to the DRAM is removed, data in the DRAM is lost. When a power loss is detected in the NVRDIMM-N or a signal is received from a host that detects an imminent power loss, the current state of the DRAM is captured and moved into persistent storage provided by a NAND of the NVRDIMM-N. With the current state of the computer logged, when power is again provided, data can be pulled back from the NAND to the DRAM, and execution of an application can continue from the point at which the execution was left off due to power removal. This capability provides value to enterprise class server systems.

In the NVRDIMM-N, a DRAM controller is provided for DRAMs and a NAND controller is provided for NANDs with the NVRDIMM-N having the responsibility to transfer the state of all the data of the DRAMs of the NVRDIMM-N into persistent data on the NANDs of the NVRDIMM-N.

The transfer of the state of all the DRAM data into persistent data on the NAND can be performed on a power cycle. Subsequently, the NVRDIMM-N has the responsibility to transfer the persistent data in the NANDs back into the DRAMs.

An enterprise class system typically stores confidential information, and consequently when storing this data persistently, the data transferred to the NANDs is protected. For example, in transferring the data from DRAMs to NANDs, the data transfer may be run through an advanced encryption standard (AES) 256-bit xor-encrypt-xor (XEX) based tweaked-codebook mode with ciphertext stealing (XTS) encryption engine, which is a standard encryption engine for data, such that all data is stored with this encryption. An AES-XTS encryption engine requires keys, that is, an encryption AES key and an XTS key. Typically, these keys are passed into the NVRDIMM-N from a host. Enhancements to processing encryption keys and passing keys with respect to a memory sub-system can provide a mechanism to avoid issues associated with hackers attempting to access encryption keys via commands from a host or intended actions by a host that may adversely affect stored secure data.

Aspects of the present disclosure address the above and other deficiencies associated with an access encryption key for a memory sub-system by encrypting the access encryption key, storing the encrypted encryption key in non-volatile memory of the memory sub-system, using firmware for the memory sub-system to transition to and from secure states for data using the encrypted media encryption key. In various example embodiments, a key is encrypted and accessed with an access key or an erase key, depending on the operation, to protect that key from hacking attempts in a memory sub-system. The key can be processed through various algorithms, which makes the key statistically un-hackable. A device such as, but not limited to, a NVDIMM-N can be operated as a multi-state device in which transitions between states of the NVDIMM-N can be handled by key management for security encryption, where the states can be defined by the security of the data stored by the device.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system 110 is a storage system. An example of a storage system is a NVDIMM. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a key encryption handling component 113 that can be used to encrypt an encryption key, store the encrypted encryption key, and manage transition to and from secure states for data using the encrypted media encryption key. In some embodiments, the controller 115 includes at least a portion of the key encryption handling component 113. For example, the controller 115 can include a processor 117 (processing device) configured to execute instructions stored in local memory 119 for performing the operations described herein. In some embodiments, the key encryption handling component 113 is part of the memory system 110, an application, or an operating system.

The key encryption handling component 113 can generate a media encryption key to encrypt data of memory components 112A to 112N of the memory sub-system 110. The key encryption handling component 113 can be configured to generate an encrypted media encryption key. The key encryption handling component 113 can store the encrypted encryption key in non-volatile memory of memory sub-system 110. The key encryption handling component 113 can access the non-volatile memory storing the encrypted encryption key and unwrap the encrypted encryption key to use the encryption key in changing state with respect to data secured in memory sub-system 110. Further details with regards to the operations of the key encryption handling component 113 are described below.

Figure 2:
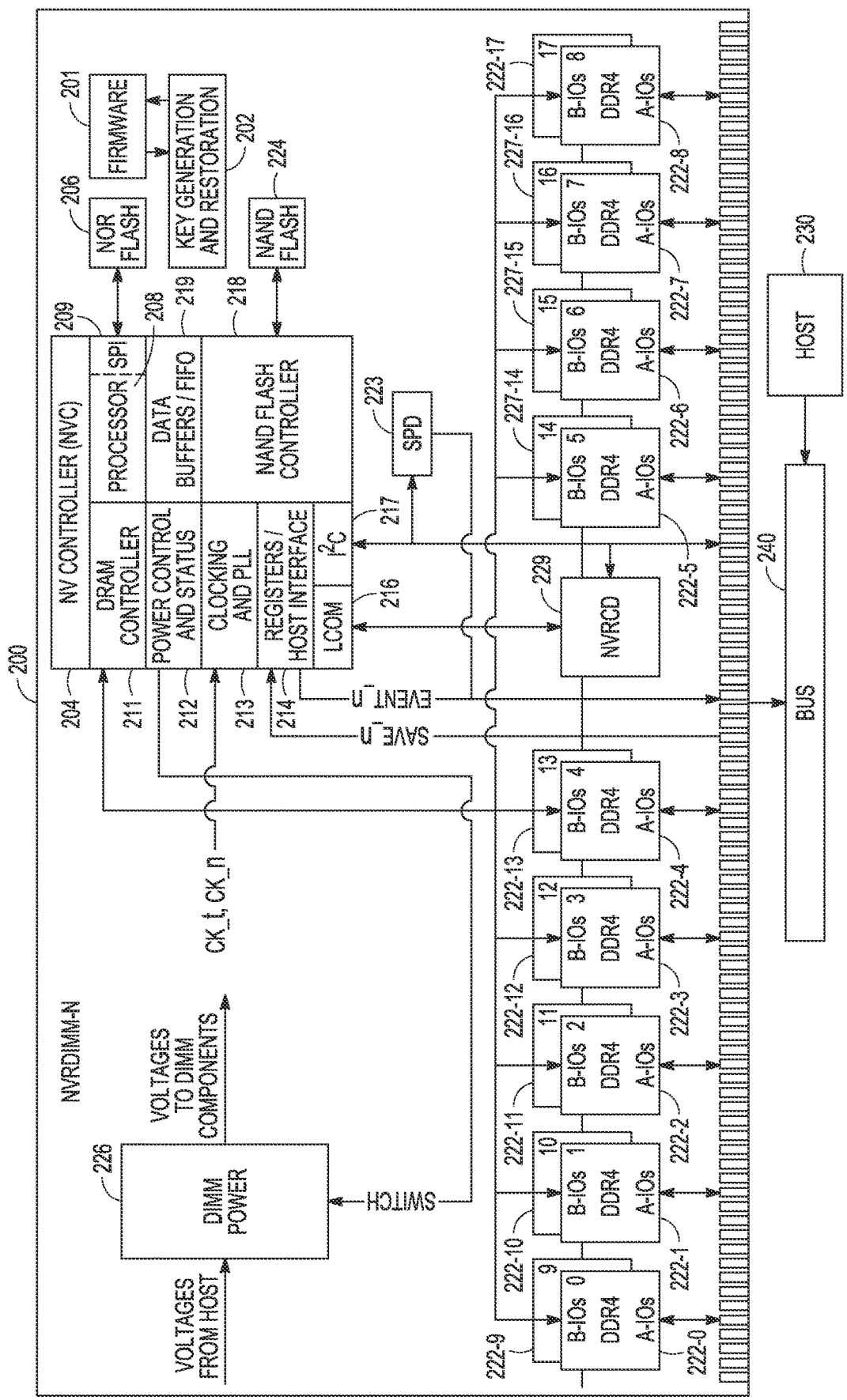
FIG. 2 is a block diagram of an example system including an example non-volatile registered dual-inline memory module structured with key management capabilities for security encryption, in accordance with various embodiments.

FIG. 2 is a block diagram of an example system including an example non-volatile registered dual-inline memory module structured with key management capabilities for security encryption, in accordance with various embodiments. A NVRDIMM-N 200 can include a non-volatile controller (NVC) 204, volatile memory components 222-0 . . . 222-17 to store data, where each of the memories can be double data rate fourth-generation dynamic random-access memory (DDR4) type of DRAM, a non-volatile memory 224, which can be a NAND flash memory, in which to dump the contents of the volatile memories if the power fails, and a DIMM power unit 226 that receives a number of different voltages from a host 230 and provides a number of different voltages to components of the NVRDIMM-N 200. The NVC 204 can include a DRAM controller 211 to control the DRAMS 222-0 . . . 222-17 and a NAND flash controller 218 to control the NAND flash memory 224. The NVC 204 can include a power control & status 212, a clocking & phase lock loops (PLLs) 213 to maintain timing relationships, a registers/host interface 214, a local communication interface (LCOM) 216, an inter-integrated circuit ($I^2C$) 217, data buffers 219 that can have a first-in-fist-out (FIFO) format, a processor 208, and a serial peripheral interface (SPI) 209. The NVRDIMM-N 200 can also include a serial presence detect (SPD) 223 that identifies the NVRDIMM-N 200.

The NVRDIMM-N 200 can operate with the host 230 to save data and return the data or provide other information regarding events on the NVRDIMM-N 200. The communication between the NVRDIMM-N 200 and the host 230 can be through a bus 240. The NVRDIMM-N 200 includes a non-volatile registering clock driver (NVRCD) 229 that is coupled to the LCOM 216 for the NVC 204 and can communicate with the host 230.

Data stored in the NVRDIMM-N 200 can be protected using encryption keys. The encryption keys can be stored in non-volatile memory on the NVRDIMM-N 200, such as in a NOR flash memory 206. With data in a protected condition, the NVRDIMM-N 200 is in a secure state. Transitions into and out of a secure state can be controlled by a firmware 201 using a key generation and restoration unit 202. The instructions in the firmware 201 can be executed by the processor 208, which is internal to the NVC 204, to handle keys stored in and retrieved from the NOR flash memory 206 through the SPI 209. The processor 208 can be a reduced instruction set computer (RISC) processor. Though the host 230 can provide input for key generation and restoration, the NVRDIMM-N 200 can be structured such that the firmware 201 controls the input from the host 230, where the host 230 does not have direct access or control of the key generation and restoration unit 202. The firmware 201 can provide an isolation of the key handling process in the NVRDIMM-N 200 from intrusion from sources external to the NVRDIMM-N 200.

There can be a number of encryption keys involved. One of the encryption keys is a media encryption key (MEK), which is the main key that protects data at rest. At rest means that the data is not in a state for which operations are being performed on the data. The MEK is generated internally in the NVRDIMM-N 200 using a deterministic random number generator (DRBG). The generation can be conducted in a number of ways. It can be generated in accordance with a government standard, for example, National Institute of Standards and Technology (NIST) SP800-90A. The generated MEK can be a 256 bit key used by an AES-XTS-256 encryption engine for the data.

The 256 bit key is actually 512 bits, since a key for the AES portion of the encryption is generated and a key for the XTS portion of the encryption is generated using the DRBG. If this MEK is generated internally and stored internally, when power disappears, then the key will disappear because it is in volatile storage. A procedure is implemented to protect this media encryption key.

In such a procedure, an access key (AK) can be supplied by the host to a NVC of the NVRDIMM-N via an I²C bus. The AK can be encrypted upon the NVC receiving the AK, providing a media key encryption key, MKEK, that protects MEK. This encryption can be conducted in a number of ways. For example, the MEK keys can be encrypted with password-based key derivation function (PBKDF) or password-based key derivation function 2 (PBKDF2) in accordance with a government standard, for example, NIST SP800-232.

As noted above, internally the DRBG generates the MEK, which is protected by an encryption algorithm, such as a PBKDF algorithm, which generates the MKEK. Next, the MEK is wrapped with the MKEK using another algorithm to generate an encrypted media encryption key (EMEK). Key wrap constructions are a class of symmetric encryption algorithms designed to encapsulate, that is encrypt, cryptographic key material. The wrapping of the MEK with the MKEK can be conducted using a wrapping algorithm in accordance with NIST SP800-38F. The generated EMEK can be stored in a non-volatile memory of the NVRDIMM-N. For example, the EMEK can be written to a NOR flash of the NVRDIMM-N, where NOR flash is a flash named after the logic form in which the basic memory cell is configured. NOR flash memory is faster to read than NAND flash memory, but takes longer to erase and write new data than with NAND flash memory, while NAND flash memory typically has a higher storage capacity than NOR flash memory.

To use the MEK to access the protected data, the EMEK is retrieved from the NOR flash memory. Key unwrapping is performed on the combination of the EMEK and the MKEK to produce the MEK, which can be used with respect to the protected data. Unwrapping provides integrity checking. Authorization of keys follows the unwrapping if the unwrap is valid.

Figure 3A:
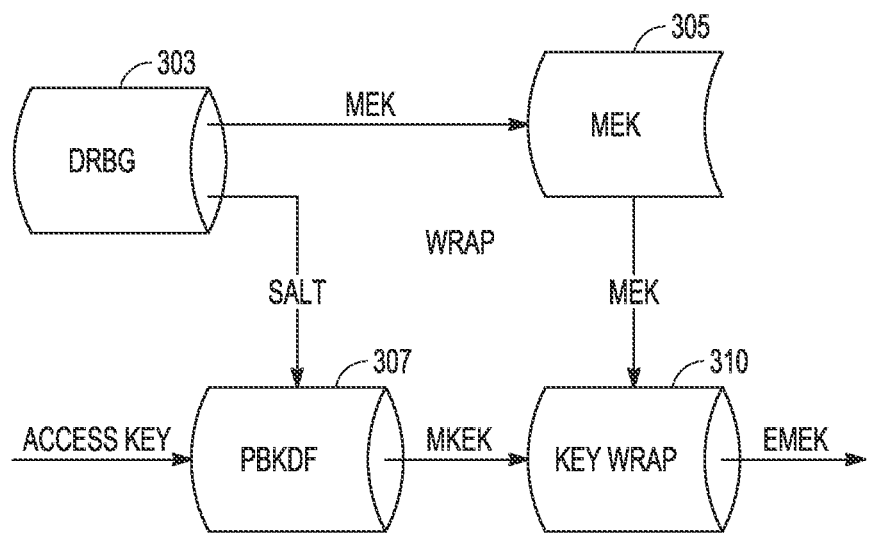
FIG. 3A is an illustration of a wrapping method to generate an encrypted media encryption key to protect a media encryption key, in accordance with various embodiments.

FIG. 3A is an illustration of a wrapping method to generate an encrypted media encryption key to protect a media encryption key, in accordance with various embodiments. This figure illustrates a wrapping process to generate an EMEK to protect a MEK, as discussed above. DRBG 303 generates a MEK that is placed in a MEK register 305, where the MEK is used to protect data. The DRBG 303 also generates a salt. A salt is a random number, which can be implemented as random bits, used to make decryption less efficient for attackers. For example, a salt can be added to another hashing layer on top of an encryption algorithm. When a passphrase is used to encrypt data, a salt can be additional data that gets concatenated to the passphrase or key. As a result of the concatenation, an attacker's dictionary now needs to contain many more entries, one for each possible salt value for each probable passphrase. The salt is used to wrap a received access key, where the wrapping can be conducted via a PBKDF 307 to generate an MKEK. A Key Wrap 310 uses the MKEK to wrap the MEK producing the EMEK. The EMEK can be stored in a NOR flash memory.

Figure 3B:
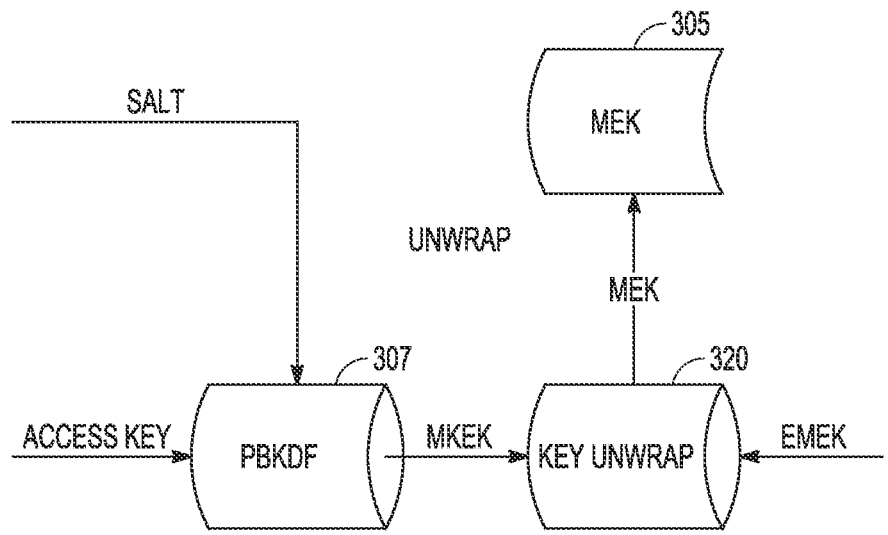
FIG. 3B is an illustration of an unwrapping method to restore the media encryption key of FIG. 3A, in accordance with various embodiments.

FIG. 3B is an illustration of an unwrapping method to restore the media encryption key of FIG. 3A, in accordance with various embodiments. This figure illustrates an unwrapping process to restore the MEK of FIG. 3A. The salt used to wrap the access key can be used with the same access key from the host to produce MKEK, via the PBKDF 307. The EMEK stored in NOR flash memory can be retrieved. A key unwrap 320 generates MEK using the generated MKEK and the stored EMEK. The unwrapping can be performed using conventional unwrapping algorithms, for example, in accordance with a government standard such as NIST SP800-38F. The MEK is only restored, for example to the MEK register 305, if the unwrap procedure is successful.

As noted, when a machine having a NVRDIMM-N is powered up after a power off of the machine, the data that has been encrypted in a NAND of the NVRDIMM-N is to be restored to the appropriate DRAM of the NVRDIMM-N. The only way to get access to this encrypted data is to regenerate the MEK, which had been wrapped and protected in NOR flash, so that a hacker cannot undo it. To acquire the MEK, the access key is to be passed into the NVRDIMM-N. The salt value, in the wrapping process, is returned to the access key on which the PBKDF algorithm is again operated to provide the MKEK. The EMEK is read from NOR flash memory and is unwrapped using the MKEK, is the reverse of the wrap process, to generate the MEK. The MEK is used to unencrypt the protected data at rest.

The NVC, such as NVC 204 of FIG. 2, can be arranged to have four device states in which transition between the four device states uses two types of keys sent to the NVC by a host, such as host 230 of FIG. 2. The two types of keys are an AK and an erase key (EK). The AK is used to access data, to unlock the NVC, and to rotate the access key. The EK is used to destroy data or unsecure the part, to change the keys in the part. The EK can be wrapped with a random number and stored in NOR flash memory as a wrapped erase key (WEK). The EK maintains the exact same level of security as the AK. The four device states are an unowned state, an unsecure state, a secure unlocked state, and a secure locked state. Device ownership differentiates between using encryption and not using encryption. Once a device has moved into the locked state, security based actions with respect to data are blocked. The unsecure state, the secure unlocked state, or the secure locked state are involved whether the NAND is read and writable meaning whether or not there is a valid MEK, whether the MEK, in wrapped form, is stored in NOR flash memory, whether or not any keys have been generated, or whether or not ownership of the NVC device has been taken.

Implementation with respect to an access key and an erase key can be conducted in a number of ways. A portion of the implementation can include register-transfer level (RTL) and a portion of the implementation can include firmware. RTL provides a technique to model a synchronous digital circuit in terms of the flow of digital signals (data) between hardware registers, and the logical operations performed on those signals. Design at the RTL level is typical practice in designing digital components. Engines for key handling, which can be carried out in RTL, include DRBG, key encryption such as PBKDF2, wrapping, and unwrapping.

Firmware is a software program or set of instructions programmed on a hardware device. It provides instructions for how the device communicates with the other computer-related hardware. The firmware can be involved with movement and tracking for key handling. It can handle key passing, that is, it directs movement of keys and calls the key encryption such as PBKDF2. The firmware also handles NOR flash access for storing wrapped encrypted keys and for restoring the wrapped encrypted keys. The firmware can handle control of access to the serial peripheral interface (SPI) to the NOR flash. The SPI is an interface bus commonly used to send data between microcontrollers and small peripherals such as shift registers, sensors, and SD card. The SPI can use separate clock and data lines, along with a select line to choose a device with which to communicate.

The firmware can execute application program interface (API) calls. An API is a set of routines, protocols, and tools that specify the manner in which software components should interact. An API call, which can also be referred to as an API request, represents a specific operation for an application to perform tasks defined by the application. The firmware can execute an API call for a correct hardware engine to be used, setting up datapaths. The firmware can also deal with the device state controlling checks, tracks, and updates of the device state. The functions of the firmware can include maintaining log status for error handling. The firmware controlling API calls provides a mechanism to interface the NVRDIMM-N, on which the firmware is located, to a host operatively coupled to the NVRDIMM-N. The host can pass keys into the NVRDIMM-N first and then sets the APIs associated with the NVRDIMM-N. Such firmware can be implemented on other NVDIMM devices.

With respect to four different device states of the NVRDIMM-N device, initially out of the factory, the device is in an unowned state, that is the factor default state and the keys are preset, which means that there is no protection for user data. In this state, if the host stores data off a DRAM to a NAND, the data can be read by any device that can couple to the NVRDIMM-N such as a hacking device. If user data, which should be protected, is in an unowned state such as the device as it comes out of the factory, the user data is not protected. Three APIs can be used along with keys that get passed between the APIs and processed through algorithms, as discussed with respect to FIGS. 3A-B above to secure the user data. The state of the device can move from an unowned state to a secured unlocked state. In a secure unlocked state, a valid MEK, which can be generated internally, can be used to save and restore encrypted data. The MEK can be restored from flash using the unwrap process. The device is in a secured state, but the device is unlocked. When data is to be protected or the device powered off, the device can be placed into secure locked state. In the secure locked state, everything in volatile memory can be deleted with an EMEK stored in NOR flash. The user data in NAND is not accessible. Everything is locked down in a hacker proof condition.

The four device states can be characterized according to a number of features. The device state being in the unowned state corresponds to a factory default state with preset keys. In the unsecure state, there is no data access to NAND of the device. In the secure_unlocked state, a generated MEK is VALID and the device is in a save and restore mode. In the secure_unlocked state, the source of the MEK can be new, generated from a DRBG, which uses an access key and erase key to create the new MEK. In the secure_unlocked state, the source of the MEK can be NOR flash in a restoration procedure using an access key in an unwrap process. In the secure_locked state, an EMEK is stored in NOR flash, the MEK, from which the EMEK is based, is deleted, and data is not accessible.

Figure 4:
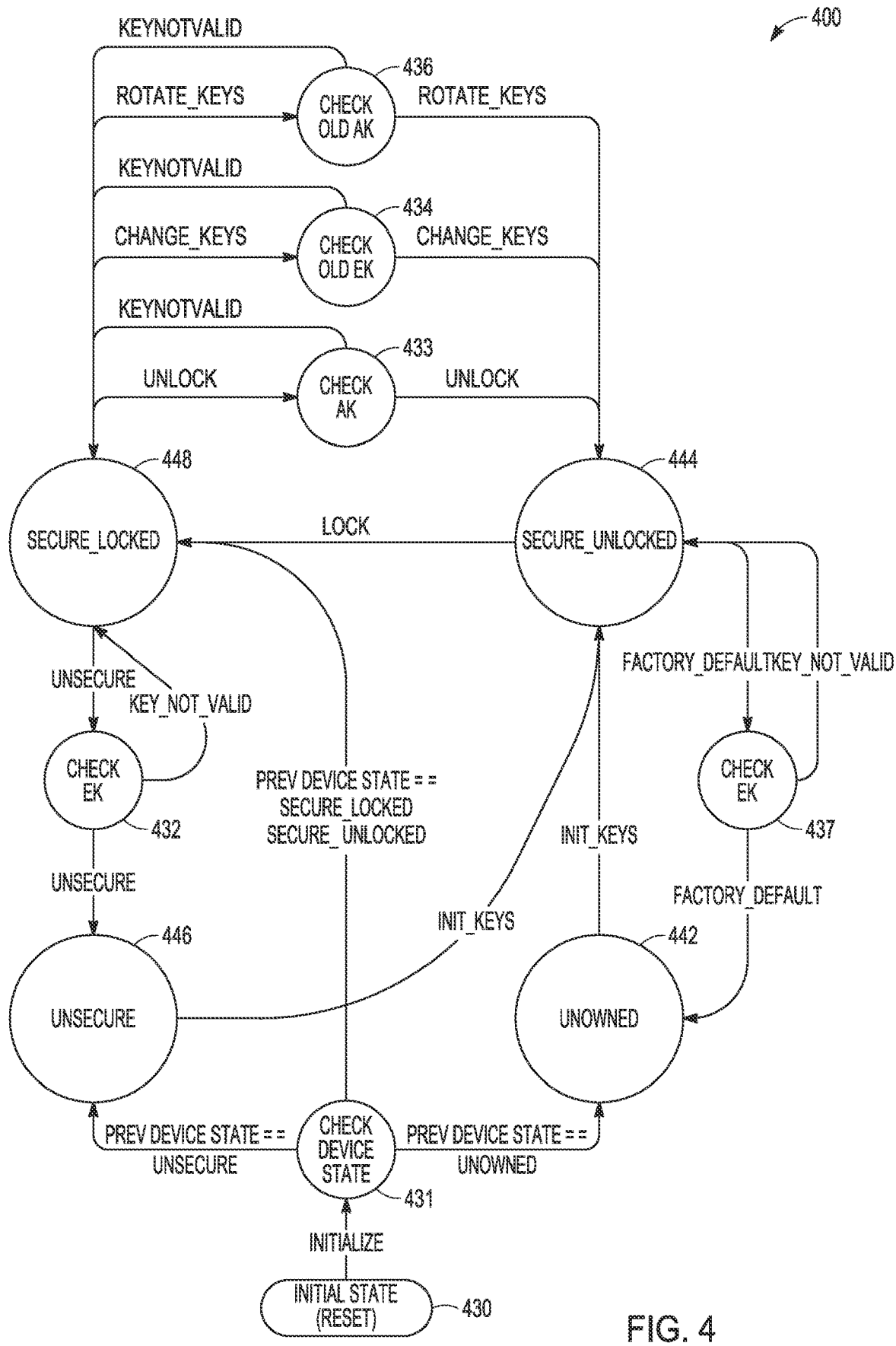
FIG. 4 is an example of a device state application program interface state diagram, in accordance with various embodiments.

FIG. 4 is an example of a device state application program interface state diagram, in accordance with various embodiments. The operational states are implemented in firmware using API calls and access keys that are passed in from the host, where the host can implement key passing in the host basic input/output system (BIOS), which is non-volatile firmware used to perform hardware initialization during power-on startup and to provide runtime services for operating systems and programs. In a device state API state diagram 400, at 430, there is an initial state or a reset state that can begin initialization by checking the device state at 431. With the previous device state being a secure_locked state, the device can come up in the secure_locked state 448. With the previous device state being an unsecure state, the device can come up in an unsecure state 446. With the previous device state being an unowned state, the device can come up in an unowned state 442, the host can supply initial keys and API to go into a secure_unlocked state 444 from which the device can be locked in a secure_locked state 448.

To transition from the unowned state 442 to the secure_unlocked state 444, the access and erase passwords are supplied and then initialization keys (init_keys) are generated to place the device into the secure_unlocked state 444. This transition is performed in the same manner for transitioning from the unsecure state 446 to secure_unlocked state 444. The transition from the secure_unlocked state 444 to the unowned state 442 is a transition returning the device back to the factory default state. To perform this transition, an erase key is required. The erase key is checked to be valid. If the erase key is valid, the keys and EMEK are cleared both from volatile and non-volatile memory. In general, this is also known in security circles as crypto-erase.

If device is then to be unlocked, the access key received from the host is checked, because the device is in the secure_locked state 448. To enter the secure_unlocked state 444 from the secure_locked state 448, an EMEK is read out of NOR flash memory, the EMEK is unwrapped and checked, at 433, against the access key that is passed in by the host to perform the unlocking. From running the unwrapping algorithm that statistically should protect the previously generated access key and determining that the access key does not match up, an error can be logged, which can be in the form of "Key Not Valid." For example, if a hacker passed in a guess access key in an attempt to access data, the check with the encrypted key stored in the NOR flash memory would recognize the guess access key as not valid and an error would be logged. A timer and a number of checks can be implemented such that if the check of the received access key does not match the unwrapped key from the NOR flash memory within a specific time or specific number of checks, the machine or application attempting to access data would be locked out. For example, the number of checks could be ten to allow ten access attempts before the accessing machine or application attempting to access data is be locked out. The number of specified attempts can have an added parameter that the number of specified attempts is to be made within a specified time. The specified number of attempts can be more or less than ten. The specified number of attempts can be selected such that statistically it would not be possible in the specified number of attempts to pick, that is, guess the correct key.

In addition to the unlock API, there can be more APIs such as a change_keys API and a rotate keys API. The change keys API provides for changing out the access keys that have been encrypted, wrapped, and stored in NOR flash memory. Changing access keys includes erasing operations. To change out the access keys that have been encrypted, wrapped, and stored in NOR flash memory, an EK input by the host is checked at 434 against the EK encrypted, wrapped, and stored in NOR flash memory, which is the old EK. The EK maintains the exact same security level as the AK. If the check indicates the EK supplied by the host for the current change key operation is not valid, an error can be logged such as "Key Not Valid."

The rotate_keys API provides for rotating a current access key to a new access key. To rotate out the access keys that have been encrypted, wrapped, and stored in NOR flash memory, an AK input by the host is checked at 436 against the AK encrypted, wrapped, and stored in NOR flash memory, which is the old AK. If the check indicates the AK supplied by the host for the current rotate key operation is not valid, an error can be logged such as "Key Not Valid." For example, periodically such as once a month, the host for security reasons can rotate out for a new access key to provide another level of security. In another example, if a given NVRDIMM-N is moved to a different machine, the host can change the access keys. The host is provided with control to rotate or change access keys, but, in this control, the data in the given NVRDIMM-N is protected by the process of checking access keys with the encrypted, wrapped keys by and stored in the NOR flash memory of the NVRDIMM-N.

At any time, the NVRDIMM-N device can be placed in the unsecure state 446. Once again, the transition from the secure_locked state 448 to the unsecure state 446 is protected. The device does not transition from the secure_locked state 448 to the unsecure state 446 without passing an EK that is checked at 432. If the check indicates the EK supplied by the host for the current transition operation is not valid, an error can be logged such as "Key Not Valid." As with other transitions, a timer and a number of checks can be implemented such that if the check of the received EK does not match the unwrapped key from the NOR flash memory within a specific time or specific number of checks, the machine or apparatus attempting to access data would be locked out. So a hacking application or device could not attempt to unsecure the part. If data was unsecured, the ability to ever access that data again would be lost, because once data is unsecured, the data is crypto erased. Crypto erased means you throw away the keys, so crypto erased is the unsecure operation. In the unsecure state 446, the device can be can re-initialized, perform maintenance, and execute other commands. The re-initialization can include generated initialization keys (init_keys) to place the device into the secure_unlocked state 444.

FIG. 5 illustrates example device state function application program interfaces, in accordance with various embodiments. Shown are a number of functions that can be executed with respect to states that a device can have. The example number of functions is shown in tabular form with respect to the four states discussed. Also shown for each function is the next state to which the device transitions from each of the four states for each given function. For example, a given function listed as init_keys deals with initialization keys. As shown, this function can be executed in the unowned state and in the unsecure state. In both cases, these functions can be executed with the next state being a secure_unlocked state. As shown, the functions change_keys, unsecure, unlock, rotate_access_keys, and other functions are not executed in the unowned state.

Figure 6:
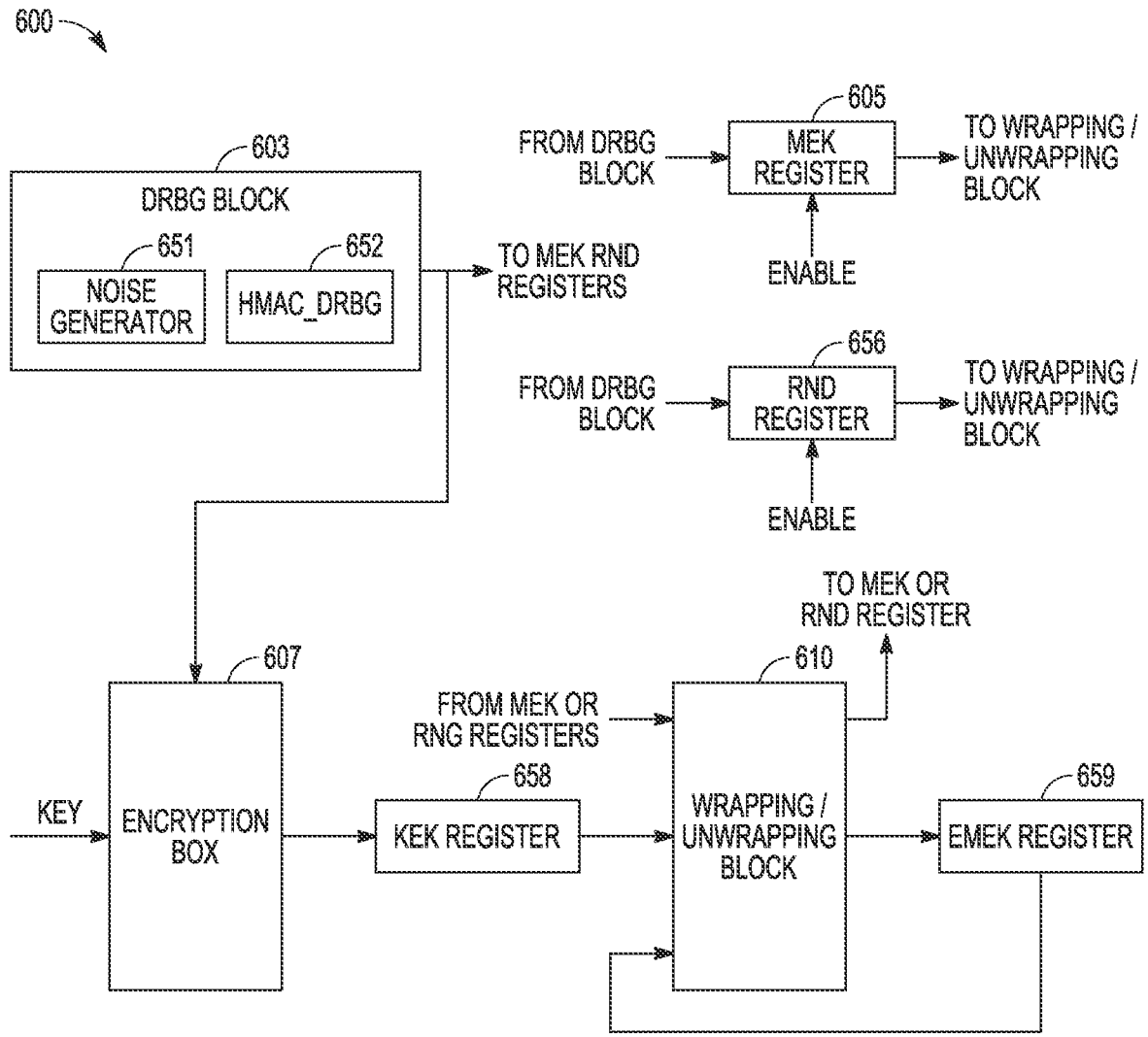
FIG. 6 is a block diagram of a key generation/restoration unit, in accordance with various embodiments.

FIG. 6 is a block diagram of a key generation/restoration unit, in accordance with various embodiments. A key generation/restoration unit 600 has hardware blocks for encryption that can be implemented to support action of the APIs that execute transitions among the device states, as discussed herein. These hardware blocks can be arranged at the NVDIMM level. The hardware blocks can include a DRBG block 603, an encryption block 607, and wrapping/unwrapping block 610 arranged similar to the components shown in FIGS. 3A and 3B. The DRBG block 603 can be realized by a DRBG 303 and the encryption block 607 can be based on the encryption being implemented such as a form of the PBKDF 307 of FIGS. 3A and 3B. The wrapping/unwrapping block 610 can be realized as two units such as the key wrap 310 and the key unwrap 320 or as a single unit that is a combination of the key wrap 310 and the key unwrap 320. These blocks can be integrated as units in a device such as the NVRDIMM-N 200 of FIG. 2 or other NVDIMM.

The DRBG block 603 can be constructed from a noise generator 651 and a keyed-hash message authentication code (HMAC) DRBG (HMAC_DRBG) 652. The noise generator 651 can be a ring oscillator. For example, the noise generator 651 can be a non-clocked Galois ring. A Galois ring is a generalization of a ring oscillator and consists of a number of inverters connected in a cascade together with a number of XOR logic gates forming a feedback. The Galois ring can be allowed to free run. Process, voltage and temperature (PVT) variation effects of fabrication parameters used in applying an integrated circuit design for the Galois ring can affect the output of the Galois ring.

HMAC is a specific type of message authentication code, sometimes referred to as a tag, involving a cryptographic hash function and a secret cryptographic key. It can be used to simultaneously verify both data integrity and authentication of a message. The HMAC_DRBG 652 can be built using a HMAC-SHA-256 engine, following, for example, NIST SP800-90a. The SHA (Secure Hash Algorithm) is one of a number of cryptographic hash functions. For example, a SHA-256 generates a fixed size 256-bit (32-byte) hash, where a hash is a one way function in that it cannot be decrypted back. The output of the noise generator 651 can have an entropy input of 256 bits to HMAC_DRBG 652. Entropy input is an input bit string that provides an assessed minimum amount of unpredictability for a DRBG mechanism. Output of the noise generator 651 can include a nonce having 256 bits. A nonce is a random or non-repeating value that is included in data exchanged by a protocol, usually for the purpose of guaranteeing the transmittal of live data rather than replayed data, to detect and protect against replay attacks.

Optional input to the HMAC_DRBG 652 can include a personalization string. The personalization string can be, but is not limited to, 256-bits and can be used in initial seed value generation for the HMAC_DRBG 652. Additional optional input to the HMAC_DRBG 652 can include a number of bits used by the HMAC_DRBG 652 for re-seed and generate operations. The additional bits can be, but is not limited to, 256-bits.

The output of the HMAC_DRBG 652 is a random value. Using the HMAC-SHA-256 engine along with 256 bit parameters associated with the noise generator 651, the personalization string, and the additional inputs from the host, the random value has 256 bits. The output of the HMAC_DRBG 652 is provided to a MEK register 605, such as the MEK register 305 of FIG. 3A, as a MEK and as a salt to the encryption block 607 or to a buffer or register that transfers the salt from the DRBG 603 to the encryption block 607. The output of the HMAC_DRBG 652 can also be provided as erase key, which can be referred to as a RND. Similar to the MEK of FIG. 3A, the RND can be provided to a RND register 656 from which it is subsequently wrapped. The MEK register 605 and the RND register 656 can include enable inputs from a counter that counts the number of attempts to pass a key without being successful. The count being less than or equal to a maximum number of attempts can be used to control output from the MEK register 605 or from the RND register 656.

The encryption block 607 can be arranged as a password encryption block such as PBKDF 307 of FIG. 3A. The encryption block 607 can include a PBKDF2 that follows NIST SP800-232. The encryption block 607 can include sub-blocks such as a HMAC following NIST SP800-232 and a SHA-256 following NIST FIPS 280-4. Inputs to the encryption block 607 can include a password input from the host, which can have 256-bits. The password is a key from the host that is loaded into the encryption block 607 by firmware on the device, such as the NVRDIMM-N 200 of FIG. 2, where the firmware acquires the key from the I²C of the device.

Inputs to the encryption block 607 can also include a salt, which is input from either the host, under control of the firmware of the device, or as a captured random value from the DRBG block 603. The salt can be 128 bits. The encryption block 607 can operate with respect to an iteration, which can be input from a host under control of the firmware of the device or a default value stored or permanently set within the device. The iteration count can include 32 bits. The iteration count can be more or less than 32 bits.

Output from the encryption block 607 includes a derived key. The derived key can be a 256-bit key. The bits of the derived key are input as encrypted keys to internal registers 658, which can be referred to as KEK registers 658. Output from these internal registers 658 is provided to the wrapping/unwrapping block 610.

The wrapping/unwrapping block 610 can use an AES-256 key wrap/unwrap procedure following NIST SP800-38F. For a key wrap mode, inputs can include the derived key generated from encryption block 607 that is captured in the internal registers, as mentioned above. The input from these internal registers is a hashed key, which can have 256 bits, referred to as key encryption key (KEK). A KEK is an encryption key whose function is to be used to encrypt and decrypt an encryption key whose function it is to encrypt and decrypt data, which encryption key is the generated MEK. In this arrangement, the KEK is the MKEK of FIG. 3A. Also input to the wrapping/unwrapping block 610 is a plain text input, which can have 256 bits. This input is the MEK from the MEK register 605 or the RND from the RND register 656.

In the key wrap mode, the output of the wrapping/unwrapping block 610 can be a cipher text output. The cipher text output can include, but is not limited to, 320 bits. The output of wrapping/unwrapping block 610 can be coupled to a EMEK register 659 as an EMEK. Firmware of the device can be structured to read and store the EMEK to a non-volatile memory. For example, the EMEK can be stored to a NOR flash memory via a SPI on a save operation by the firmware. The firmware can read the NOR flash memory via the SPI and write the EMEK to EMEK register 659 on a restore operation of an unwrap procedure.

In the key unwrap mode, the inputs to the wrapping/unwrapping block 610 include the MKEK, which is the hashed key from the internal registers 658 that captured the output from encryption block 607. The inputs to wrapping/unwrapping block 610 include a cipher text input from the EMEK register 659, which holds the encrypted MEK or RND. The cipher text input can include, but is not limited to, 320 bits. In the key unwrap mode, the output of wrapping/unwrapping block 610 can be a plain text output. The cipher text output can include, but is not limited to, 256 bits. This output can be provided to either the MEK register 605 or the RND register 656.

The key generation/restoration unit 600 is configured internal to the device that controls storage and security of data. For example, key generation/restoration unit 600 can be configured internal to a NVDIMM such as, but not limited to, the NVRDIMM-N 100 of FIG. 2. The components of key generation/restoration unit 600 can be arranged such that they are not accessible to the I²C or JTAG interface to the respective NVDIMM. JTAG refers to the Joint Test Action Group that provided recommendations for standard test access port and boundary scan architecture for electronic devices. Control of signals and parameters input from a host is handled by firmware structured with respect to the components of the respective NVDIMM to provide isolation of the control of the state of the respective NVDIMM to protect data of the NVDIMM.

The key generation/restoration unit 600 provides keys for key handling by firmware to execute different API calls with respect to a NVDIMM to protect data secured in the NVDIMM. There are a number of API commands that a host can pass over an I²C to a device such as a NVDIMM. These API commands can include commands to initiate keys, change keys, unsecure the device, unlock the device, lock the device, rotate an access key, test an access key, test an erase key. Requests to unlock, lock, and unsecure are made relative to data being protected by the device. Other API commands can be included depending on the device that controls storage and security of data. These are API commands that firmware will register and provide execution. The firmware will interface with the hardware blocks of the key generation/restoration unit 600 diagram to protect user data in transitions in the states of the device relative to the security of the data stored and protected by the data. Firmware internal to the device, such as a NVDIMM, controls transitions between states of the device and routing of keys to protect data of the device.

In a NVDIMM, such as the NVRDIMM-N 200 of FIG. 2, while the processor internal to the non-volatile controller (NVC) is running to execute the functions of the various API, a busy bit is set. If the execution is not successful on any aspect, an error can be logged. Examples of different errors can include retry access key count error, retry erase key count error, device state error, no old erase key sent, no old access key sent, no erase key sent, no access key sent, and invalid key. For instance, suppose a user host tried to unlock the device because it was in a secure lock state and passed in an access key to perform the unlocking. The provided access key would be subjected to the PDKF2 of the encryption block 607 and it would be unwrapped in the wrapping/unwrapping block 610 with the encrypted key from NOR flash. If that failed, the error stating invalid key would be set. With the host accidently passing into the device an invalid key, the device provides the error information to the host, which allows the host to try again. If a hacker device was attempting to pass a guess access key, this invalid key error would also get set when the guess access key was not validated. Other actions that results in generation of an error code can include such actions as not sending to the device an access key for the attempted command or the device being in the wrong state. Certain APIs can only be executed with the device being in a correct state. If the number of attempts to execute an API exceeds a set number of times to retry the command, for example but not limited to exceeding ten retries, an error is logged. The error can be logged as a retry access key count error or a retry erase key count error.

In executing API calls in a device such as a NVDIMM, firmware can be arranged to receive a API command. Hardware in the NVDIMM associated with the firmware sets a busy bit to indicate API execution is in progress. The firmware can clear out any old status, execute the API, set appropriate state of the device and log errors, and clear the busy bit when the execution is completed. The following are example API functions, mentioned above, that can be implemented by passing encryption keys.

For execution of the initialize keys (init_keys) API command, the keys used include access key and erase key. First, the state of the device must be in the unsecure state or the unowned state. If the state of the device is secure_unlocked state or secure_locked state, the device state error is set and the process is exited. In this procedure to check the state of the device, the device in the unsecure state remains unsecure until later processing. Second, a check is made to determine that the host sent an access key and an erase key. If none or one of the keys is supplied from the host, set the no access key sent and/or the no erase key sent and exit the process. Third, in the continued process, a MEK is generated using the DRBG hardware block of the device. Fourth, an EMEK is generated using the access key and the EMEK is stored in non-volatile memory, such as a NOR flash memory, in the device via a SPI. Fifth, a WEK, which is a wrapped erase key, is generated using RND and the WEK is stored to the non-volatile memory in the device via the SPI. Sixth, the device state is set to secure_unlocked.

For execution of the change_keys API command, the keys used include an access key, an erase key, and an old erase key. First, the device state must be the secure_unlocked state or the secure_locked state. If the device state is secure_unlocked call the lock API. If the device state is unsecure, set the device state error status and exit. If the device state is unsecure, the device state remains unsecure. Second, check that the host sent an access key, erase key, and old erase key. If none of the keys are supplied, set the no xkey sent error, where xkey is one or more of access key, erase key, and old erase key, and exit. Third, read the WEK (wrapped erase key) from the non-volatile memory, such as a NOR flash memory, of the device via the SPI on the device. Fourth, unwrap the WEK using an old erase key. Fifth, check that the unwrap was valid. Set the invalid key error, if the unwrap failed and exit. Increment the retry EK count. The device state remains in the secure_locked state. Sixth, generate a MEK using the DRBG hardware block of the device. Seventh, wrap the MEK to form the EMEK using the access key. Store the EMEK to the non-volatile memory, such as a NOR flash memory, of the device via the SPI. Eighth, wrap the erase key to a WEK using RND and store the WEK to the non-volatile memory, such as a NOR flash memory, of the device via the SPI. Ninth, set the device state to secure_unlocked.

For execution of the rotate_keys API command, the keys used can include an access key and an old access key. First, the device state must be in the secure_unlocked state or the secure_locked state. If the device state is in the unsecure state, set the device state error and exit. Second, check that the host sent an access key and an old access key. If none supplied set the xkey not sent, where the xkey is one or more of the access key and the old access key, and exit. Third, read the EMEK from the non-volatile memory, such as a NOR flash memory, in the device via a SPI. Fourth, unwrap the EMEK using the old access key. Fifth, check that the unwrap was valid. Set the invalid key error, if unwrap failed and exit. Increment the retry AK count. Sixth, wrap the MEK to form the EMEK using the access key, and store EMEK to the non-volatile memory, such as a NOR flash memory, of the device via the SPI. Seventh, set the device state to the secure_unlocked state.

For execution of the unsecure API command, the keys used include an erase key. First, the device state must be in the secure_unlocked state or in the secure_locked state. If the device state is in the unsecure state, this is a no operation (NOP) state and exit. Second, check that the host sent an erase key. If none is supplied, set the no erase key sent error and exit. Third, read the WEK (wrapped erase key) from the non-volatile memory, such as a NOR flash memory, of the device via the SPI. Fourth, unwrap the WEK using the host provided erase key. Fifth, check that the unwrap was valid. Set the invalid key error, if the unwrap failed and exit. Increment retry EK count. The device state remains in the secure_locked state or in the secure_unlocked state. Sixth, delete the MEK and EMEK and zero out the EMEK and WEK in the non-volatile memory, such as a NOR flash memory, of the device via the SPI. Seventh, set the device state to unsecure.

For execution of the unlock API command, the keys used include an access key. First, the device state must be in the secure_locked state. If the device state is the unsecure state or the secure_unlocked state, this is a NOP and exit. Second, check that the host sent an access key. If none is supplied, set the no access key sent error and exit. Third, read the EMEK from the non-volatile memory, such as a NOR flash memory, of the device via the SPI. Fourth, unwrap the EMEK using the access key, where the destination is the MEK register. Fifth, check that the unwrap was valid. Set the invalid key error if the unwrap failed and exit. Increment the retry AK count. The device state remains in the secure_locked state. Sixth, set the device state to the secure_unlocked state.

For execution of the lock API command, no keys are needed. First, the device state must be in the secure_unlocked state. If the device state is in the unsecure state, set device state error and exit. If the device state is the secure_locked state, this is a NOP and exit. Second, delete the MEK and volatile EMEK with the valid EMEK in the non-volatile memory, such as a NOR flash memory, of the device. Third, set the device state to the secure_locked state.

For execution of the test_AK API command, the keys used include an access key. First, check that the host sent an access key. If none is supplied, set the no access key sent error and exit. Second, read the EMEK from the non-volatile memory, such as a NOR flash memory, of the device. Third, the EMEK is unwrapped using the access key. Fourth, check that the unwrap was valid. Increment the retry AK count, if the unwrapping failed. Set the invalid key error, if the unwrap failed and exit. Clear the retry AK count if the unwrap passed.

For execution of the test_EK API command, the keys used include an erase key. First, check that the host sent an erase key. If none is supplied, set the no erase key sent error and exit. Second, read the WEK from the non-volatile memory, such as a NOR flash memory, of the device. Third, unwrap the WEK using the erase key. Fourth, check that the unwrap was valid. Increment the retry EK count, if the unwrap failed. Set the invalid key error if unwrap failed and exit. Clear the retry EK count, if the unwrap passed.

For execution of the factory default API command, because the state will change back to unowned, the erase key is used to verify. First, check the device state. If the device state is the unowned state, continue factory default operation. Else if the device state is not in the secure_unlocked state, set the device state error. Second, check that the host has sent an erase key. Third, read the WEK from the non-volatile memory, such as a NOR flash memory, of the device. Fourth, unwrap the EMEK using the erase key. Fifth, check that the unwrap was valid. Sixth, clear the MEK/EMEK. Seventh, continue a byte addressable energy backed interface (BAEBI) defined factory default operation.

For execution of the reset/initialization/watchdog API command, first, on powerup a reset, such as a NVC reset, will execute. Second, in addition to the other initial tasks, the previous device state will be checked. If the previous device state was unsecure, set the device state to the unsecure state. The MEK will be default keys for unsecure mode users. Third, if the persistent device state was the secure_unlocked state or the secure_locked state, set the device state to the secure_locked state. The event pin can be set to trigger the host to pass an access key to go to the secure_unlocked state.

With respect to the retry count of authentication failing, a separate authentication retry count is maintained for each key. This retry count can be adjustable by the user. The retry count can have a default of ten for each key. An authentication retry count is reset to 0 each time authentication succeeds. A certain level of failure is fine. The fail count will not persist. The device will not change operating mode due to the maximum retry count being reached, beyond disabling further attempt. A decision on what to do when the maximum retry count is reached can depend on the application to which the system is applied. Retry exceeded error can be made available to the host.

Figure 7:
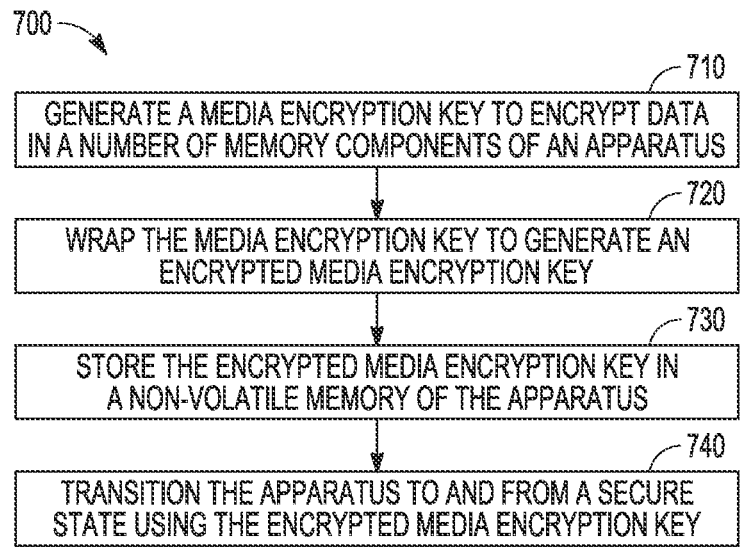
FIG. 7 a flow diagram of an example method to handle encryption keys, in accordance with various embodiments.

FIG. 7 a flow diagram of an example method 700 to handle encryption keys, in accordance with various embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the key encryption handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 700 can be deployed on the NVRDIMM-N 200. It will be appreciated that the method 700 can be deployed on other hardware configurations. Likewise, the NVRDIMM-N 200 can be used to deploy other methods to handle encryption keys. At block 710, a processing device, such as associated with key generation and restoration unit 202 of NVRDIMM 200 of FIG. 2, generates a media encryption key to encrypt data in a number of memory components of an apparatus. At block 720, the processing device wraps the media encryption key to generate an encrypted media encryption key. At block 730, the processing device stores the encrypted media encryption key in a non-volatile memory of the apparatus, such as the NOR flash memory 206 of NVRDIMM 200 of FIG. 2. At block 740, the processing device transitions the apparatus to and from a secure state using the encrypted media encryption key. The apparatus can be a four state apparatus, the four states being an unowned state, a secure_unlocked state, a secure_locked state, and an unsecure state.

Variations of the method 700 or methods similar to the method 700 can include a number of different embodiments that can be combined depending on the application of such methods and/or the architecture of systems in which such methods are implemented. Such methods can include generating an erase key; wrapping the erase key to form a wrapped erase key; and sending the wrapped erase key to the non-volatile memory. The method 700 or similar methods can include receiving an access key or an erase key for an operation that transitions from the secure_locked state; and performing the operation using the access key or the erase key for the operation based on a successful unwrapping operation on the encrypted media encryption key or the wrapped erase key with respect to the respective received access key or received erase key for the operation.

Figure 8:
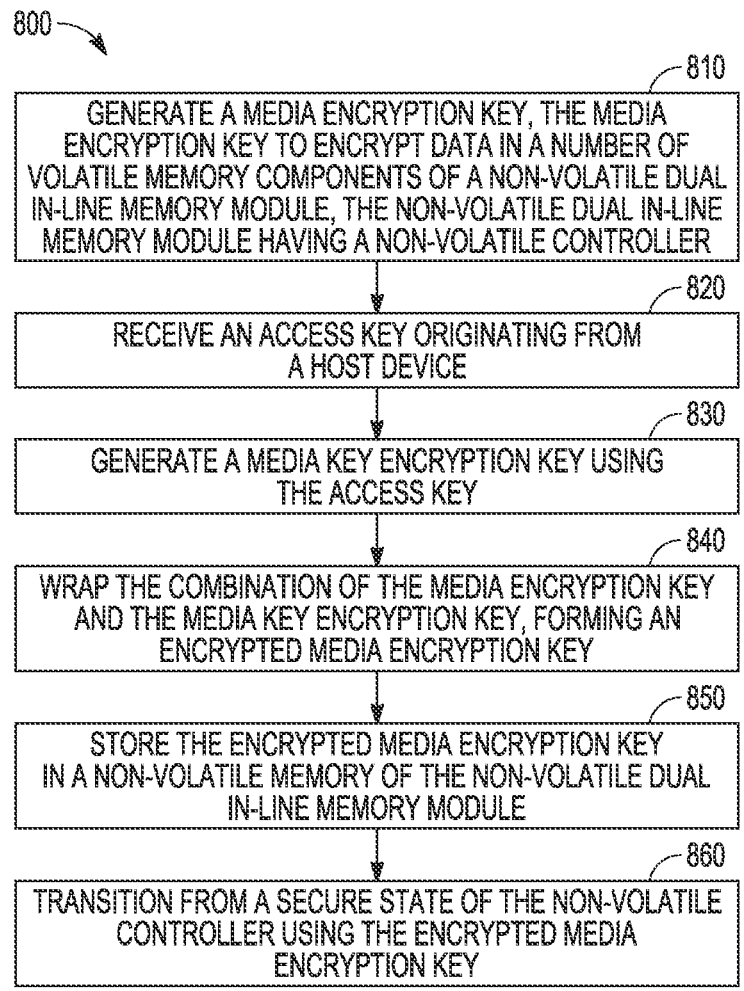
FIG. 8 is a flow diagram of an example method to handle encryption keys, in accordance with various embodiments.

FIG. 8 is a flow diagram of an example method 800 to handle encryption keys, in accordance with various embodiments. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the key encryption handling component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 800 can be deployed on the NVRDIMM-N 200. It will be appreciated that the method 800 can be deployed on other hardware configurations. Likewise, the NVRDIMM-N 200 can be used to deploy other methods for handling encryption keys. At block 810, a processing device of memory sub-system, such as associated with key generation and restoration unit 202 of NVRDIMM 200 of FIG. 2, generates a media encryption key, the media encryption key configured to encrypt data in a number of volatile memory components of a non-volatile dual in-line memory module, where the non-volatile dual in-line memory module has a non-volatile controller. At block 820, the memory sub-system, such as the NVRDIMM-N 200 of FIG. 2, receives an access key originating from a host device. At block 830, the processing device generates a media key encryption key using the access key. At block 840, the processing device wraps the combination of the media encryption key and the media key encryption key, forming an encrypted media encryption key. At block 850, processing device stores the encrypted media encryption key in a non-volatile memory of the non-volatile dual in-line memory module, such as the NOR flash memory 206 of NVRDIMM 200 of FIG. 2. At block 860, the processor transitions the non-volatile controller from a secure state using the encrypted media encryption key. The non-volatile controller is operated as a four state device, the four states being a unowned state, a secure_unlocked state, a secure_locked state, and a unsecure state.

Variations of the method 800 or methods similar to the method 800 can include a number of different embodiments that can be combined depending on the application of such methods and/or the architecture of systems in which such methods are implemented. Such methods can include receiving an access key from a host device; using the access key to unlock the non-volatile controller or rotate to another access key; and executing the unlocking of the non-volatile controller or the rotating to another access based on a successful unwrapping of the encrypted media encryption key with respect to the received access key.

The method 800 or similar methods can include generating an erase key; wrapping the erase key to form a wrapped erase key; and sending the wrapped erase key to the non-volatile memory. The method 800 or similar methods can include receiving an erase key from a host device; using the erase key to unsecure the non-volatile controller or change a key in the non-volatile memory; and executing the unsecuring of the non-volatile controller or the changing of the key based on a successful unwrapping of the wrapped erase key with respect to the received erase key.

The methods 700 and 800 and methods similar to methods 700 and 800 can include features associated with any of FIGS. 1-6. The methods 700 and 800 and methods similar to the methods 700 and 800 can also include features associated with encryption key handling techniques as taught herein.

Firmware can comprise instructions, such as a microcode, which when executed by a controller, can cause performance of operations comprising: generating a media encryption key to encrypt data in a number of memory components of an apparatus; wrapping the media encryption key to generate an encrypted media encryption key; storing the encrypted media encryption key in a non-volatile memory of the apparatus; and transitioning the apparatus to and from a secure state using the encrypted media encryption key. The apparatus can be a four state apparatus, the four states being an unowned state, a secure_unlocked state, a secure_locked state, and an unsecure state.

Instructions of the firmware, which when executed by a controller, can cause performance of operations, which operations can include generating an erase key; wrapping the erase key to form a wrapped erase key; and sending the wrapped erase key to the non-volatile memory. The instructions can include instructions to perform operations including receiving an access key or an erase key for an operation that transitions from the secure_locked state; and performing the operation using the access key or the erase key for the operation based on a successful unwrapping operation on the encrypted media encryption key or the wrapped erase key with respect to the respective received access key or received erase key for the operation.

Firmware can comprise instructions, such as a microcode, which when executed by a controller, can cause performance of operations comprising: generating a media encryption key, the media encryption key to encrypt data in a number of volatile memory components of a non-volatile dual in-line memory module, the non-volatile dual in-line memory module having a non-volatile controller; receiving an access key originating from a host device; generating a media key encryption key using the access key; wrapping the combination of the media encryption key and the media key encryption key, forming an encrypted media encryption key; storing the encrypted media encryption key in a non-volatile memory of the non-volatile dual in-line memory module; and transitioning from a secure state of the non-volatile controller using the encrypted media encryption key. The non-volatile controller can be operated as a four state device, the four states being a unowned state, a secure_unlocked state, a secure_locked state, and a unsecure state.

Instructions of the firmware, which when executed by a controller, can cause performance of operations, which operations can include receiving an access key from a host device; using the access key to unlock the non-volatile controller or rotate to another access key; and executing the unlocking of the non-volatile controller or the rotating to another access based on a successful unwrapping of the encrypted media encryption key with respect to the received access key. Instructions of the firmware, which when executed by a controller, can cause performance of operations, which operations can include generating an erase key; wrapping the erase key to form a wrapped erase key; and sending the wrapped erase key to the non-volatile memory. The operations can include receiving an erase key from a host device; using the erase key to unsecure the non-volatile controller or change a key in the non-volatile memory; and executing the unsecuring of the non-volatile controller or the changing of the key based on a successful unwrapping of the wrapped erase key with respect to the received erase key.

Firmware can comprise instructions, such as a microcode, which when executed by a controller, can cause performance of operations comprising operations associated with encryption key handling in a device and operations associated with the device associated with the FIGS. 1-8: Instructions of the firmware, which when executed by a controller, can cause performance of operations, which operations can include operations as taught herein.

In various embodiments, an apparatus comprises: a number of memory components; an encryption key generator to generate a media encryption key to encrypt data in the number of memory components, the encryption key generator configured to wrap the media encryption key to generate an encrypted media encryption key; a non-volatile memory to store the encrypted media encryption key; and firmware having instructions to transition the apparatus to and from a secure state using the encrypted media encryption key. The apparatus can be a four state apparatus, where the four states are an unowned state, a secure_unlocked state, a secure_locked state, and an unsecure state.

The firmware can have instructions to perform an operation that transitions from the secure_locked state to the secure_unlocked state using an access key received from a host device, including a successful unwrapping operation on the encrypted media encryption key with respect to the received access key. The encryption key generator can be configured to generate an erase key, to wrap the erase key to form a wrapped erase key, and to send the wrapped erase key to the non-volatile memory. The firmware can have instructions to perform an operation that transitions from the secure_locked state to the secure_unlocked state using an erase key received from a host device, including a successful unwrapping operation on the wrapped erase key with respect to the received erase key. The apparatus can include various features or combinations of features as taught herein.

The encryption key generator of the apparatus can include: a deterministic random number generator to generate a random number as the media encryption key; an encryption block to receive the random number and an access key generated by a host device and to generate a media key encryption key by use of a first encryption algorithm; and a wrapping block to receive the media key encryption key and the media encryption key and to generate the encrypted media encryption key by use of a second encryption algorithm.

In various embodiments, a non-volatile dual in-line memory module can comprise: a number of volatile memory components; a first non-volatile memory in which to dump contents of the volatile memory components upon detection of a power failure; a non-volatile controller to control the number of volatile memory components and the non-volatile memory; an encryption key generator to generate a media encryption key to encrypt data in the number of memory components, the encryption key generator configured to wrap the media encryption key to generate an encrypted media encryption key; a second non-volatile memory to store the encrypted media encryption key; and firmware having instructions to transition the non-volatile controller to and from a secure state using the encrypted media encryption key. The non-volatile controller can be operated as a four state device, the four states being a unowned state, a secure_unlocked state, a secure_locked state, and a unsecure state. The non-volatile dual in-line memory module can include various features or combinations of features as taught herein.

The encryption key generator can be configured to generate an erase key, to wrap the erase key to form a wrapped erase key, and to send the wrapped erase key to the second non-volatile memory. The firmware can have instructions to perform an operation that transitions from the secure_locked state using an access key or an erase key for the operation, received from a host device, based on a successful unwrapping operation on the encrypted media encryption key or the wrapped erase key with respect to the respective received access key or received erase key for the operation.

The firmware of the non-volatile dual in-line memory module can have instructions to: move keys and call an encryption algorithm to generate a media key encryption key for wrapping or unwrapping; control access to the second non-volatile memory; execute application program interface calls including setting up datapaths to hardware for the respective application program interface calls; check, track, and update the state of the non-volatile controller; and maintain a log status with respect to error handling.

In various embodiments, a system comprises: a host device and a non-volatile dual in-line memory module operatively coupled to the host device. The non-volatile dual in-line memory module can include: dynamic random-access memory components; a NAND flash memory in which to dump contents of the dynamic random-access memory components upon detection of a power failure; a non-volatile controller to control the dynamic random-access memory components and the NAND flash memory; an encryption key generator to generate a media encryption key to encrypt data in the dynamic random-access memory components, the encryption key generator configured to wrap the media encryption key to generate an encrypted media encryption key; a NOR flash memory to store the encrypted media encryption key; and firmware having instructions to transition the non-volatile controller to and from a secure state using the encrypted media encryption key. The non-volatile controller can be operated as a four state device, the four states being a unowned state, a secure_unlocked state, a secure_locked state, and a unsecure state. The system can include various features or combinations of features as taught herein.

The encryption key generator can be configured to generate an erase key, to wrap the erase key to form a wrapped erase key, and to send the wrapped erase key to the second non-volatile memory. The firmware can have instructions to perform an operation that transitions from the secure_locked state using an access key or an erase key for the operation, received from a host device, based on a successful unwrapping operation on the encrypted media encryption key or the wrapped erase key with respect to the respective received access key or received erase key for the operation.

The host device can provide an access key for use in the generation of the encrypted media encryption key. The firmware can have instructions to handle generation and restoration of encryption keys such that generation and restoration of encryption keys is isolated from direct access by the host device.

Figure 9:
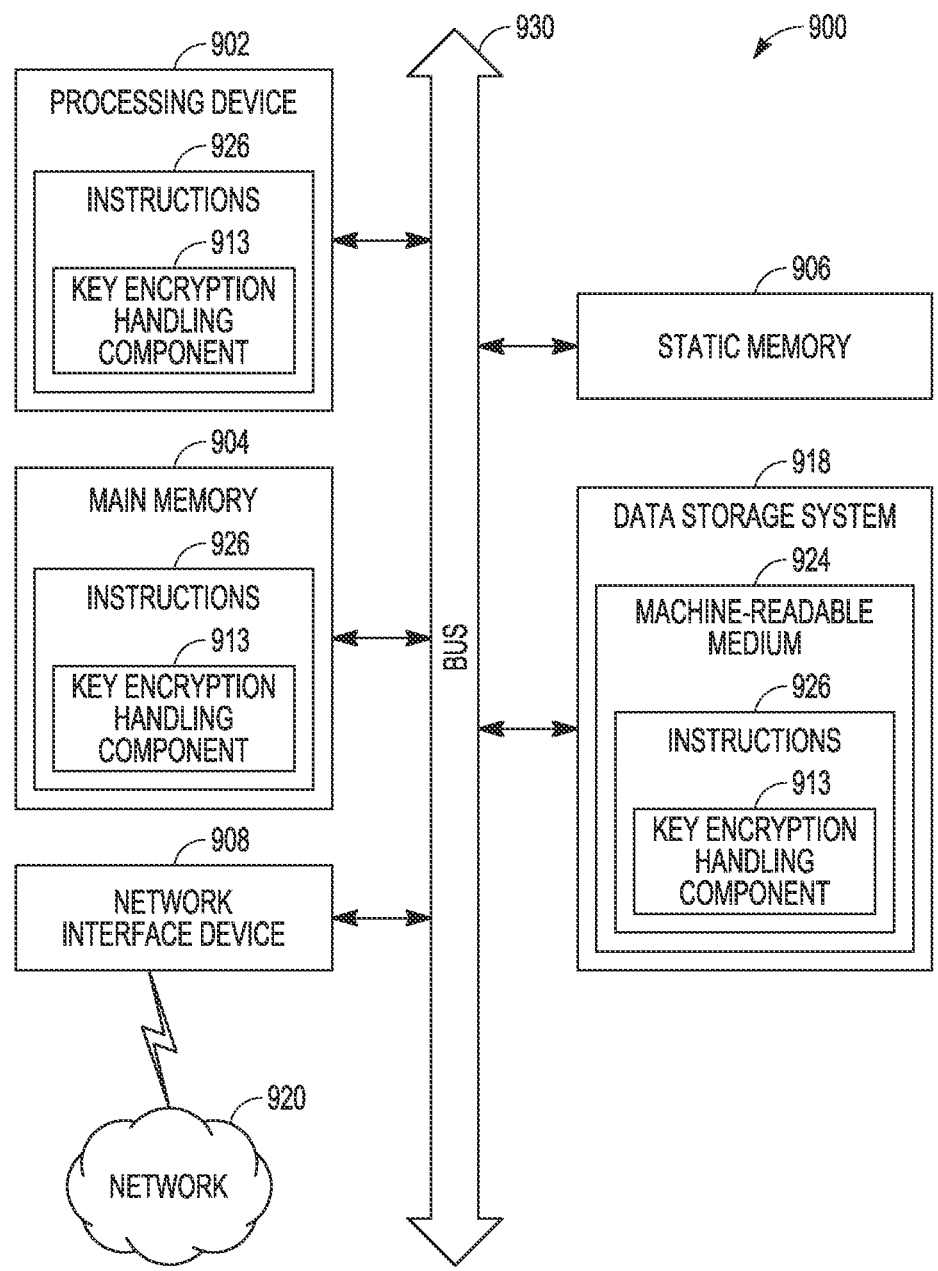
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the key encryption handling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

The processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory sub-system 110 of FIG. 1.

In one embodiment, the instructions 926 include instructions to implement functionality corresponding to a key encryption handling component (e.g., the key encryption handling component 113 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The following are example embodiments of methods, apparatus, and systems, in accordance with the teachings herein.

An example apparatus 1 can comprise: a plurality of memory components; an encryption key generator to generate a media encryption key to encrypt data in the plurality of memory components, the encryption key generator configured to wrap the media encryption key to generate an encrypted media encryption key; a non-volatile memory to store the encrypted media encryption key; and firmware having instructions to transition the apparatus to and from a secure state using the encrypted media encryption key.

An example apparatus 2 can include elements of example apparatus 1, wherein the apparatus is a four state apparatus, the four states being an unowned state, a secure_unlocked state, a secure_locked state, and an unsecure state.

An example apparatus 3 can include elements of any preceding example apparatus, wherein the firmware has instructions to perform an operation that transitions from the secure_locked state to the secure_unlocked state using an access key received from a host device, including a successful unwrapping operation on the encrypted media encryption key with respect to the received access key.

An example apparatus 4 can include elements of any preceding example apparatus, wherein the encryption key generator is configured to generate an erase key, to wrap the erase key to form a wrapped erase key, and to send the wrapped erase key to the non-volatile memory.

An example apparatus 5 can include elements of any preceding example apparatus, wherein the firmware has instructions to perform an operation that transitions from the secure_locked state to the secure_unlocked state to change out an access key using an erase key received from a host device, including a successful unwrapping operation on the wrapped erase key with respect to the received erase key.

An example apparatus 6 can include elements of any preceding example apparatus, wherein the encryption key generator includes: a deterministic random number generator to generate a random number as the media encryption key; an encryption block to receive the random number and an access key generated by a host device and to generate a media key encryption key by use of a first encryption algorithm; and a wrapping block to receive the media key encryption key and the media encryption key and to generate the encrypted media encryption key by use of a second encryption algorithm.

An example non-volatile dual in-line memory module 1 comprises: a plurality of volatile memory components; a first non-volatile memory in which to dump contents of the volatile memory components upon detection of a power failure; a non-volatile controller to control the plurality of volatile memory components and the non-volatile memory; an encryption key generator to generate a media encryption key to encrypt data in the plurality of memory components, the encryption key generator configured to wrap the media encryption key to generate an encrypted media encryption key; a second non-volatile memory to store the encrypted media encryption key; and firmware having instructions to transition the non-volatile controller to and from a secure state using the encrypted media encryption key.

An example non-volatile dual in-line memory module 2 can include elements of any preceding example apparatus and example non-volatile dual in-line memory module 1, wherein the non-volatile controller is operated as a four state device, the four states being a unowned state, a secure_unlocked state, a secure_locked state, and a unsecure state.

An example non-volatile dual in-line memory module 3 can include elements of any preceding example apparatus and any preceding example non-volatile dual in-line memory module, wherein the encryption key generator is configured to generate an erase key, to wrap the erase key to form a wrapped erase key, and to send the wrapped erase key to the second non-volatile memory.

An example non-volatile dual in-line memory module 4 can include elements of any preceding example apparatus and any preceding example non-volatile dual in-line memory module, wherein the firmware has instructions to perform an operation that transitions from the secure_locked state using an access key or an erase key for the operation, received from a host device, based on a successful unwrapping operation on the encrypted media encryption key or the wrapped erase key with respect to the respective received access key or received erase key for the operation.

An example non-volatile dual in-line memory module 5 can include elements of any preceding example apparatus and any preceding example non-volatile dual in-line memory module, wherein the firmware has instructions to: move keys and call an encryption algorithm to generate a media key encryption key for wrapping or unwrapping; control access to the second non-volatile memory; execute application program interface calls including setting up datapaths to hardware for the respective application program interface calls; check, track, and update the state of the non-volatile controller; and maintain a log status with respect to error handling.

An example system 1 comprises: a non-volatile dual in-line memory module configured to operatively couple to a host device, the non-volatile dual in-line memory module including: dynamic random-access memory components; a NAND flash memory in which to dump contents of the dynamic random-access memory components upon detection of a power failure; a non-volatile controller to control the dynamic random-access memory components and the NAND flash memory; an encryption key generator to generate a media encryption key to encrypt data in the dynamic random-access memory components, the encryption key generator configured to wrap the media encryption key to generate an encrypted media encryption key; a NOR flash memory to store the encrypted media encryption key; and firmware having instructions to transition the non-volatile controller to and from a secure state using the encrypted media encryption key.

An example system 2 can include elements of example system 1 and elements of any preceding example apparatus and any preceding example non-volatile dual in-line memory module, wherein the non-volatile controller is operated as a four state device, the four states being a unowned state, a secure_unlocked state, a secure_locked state, and a unsecure state.2

An example system 3 can include elements of any preceding example system, and elements of any preceding example apparatus and any preceding example non-volatile dual in-line memory module, wherein the encryption key generator is configured to generate an erase key, to wrap the erase key to form a wrapped erase key, and to send the wrapped erase key to the second non-volatile memory.

An example system 4 can include elements of any preceding example system, and elements of any preceding example apparatus and any preceding example non-volatile dual in-line memory module, wherein the firmware has instructions to perform an operation that transitions from the secure_locked state using an access key or an erase key for the operation, received from a host device, based on a successful unwrapping operation on the encrypted media encryption key or the wrapped erase key with respect to the respective received access key or received erase key for the operation.

An example system 5 can include elements of any preceding example system, and elements of any preceding example apparatus and any preceding example non-volatile dual in-line memory module, wherein the host device provides an access key for use in the generation of the encrypted media encryption key.

An example system 6 can include elements of any preceding example system, and elements of any preceding example apparatus and any preceding example non-volatile dual in-line memory module, wherein the firmware has instructions to handle generation and restoration of encryption keys such that generation and restoration of encryption keys is isolated from direct access by the host device.

An example method 1 comprises: generating a media encryption key to encrypt data in a plurality of memory components of an apparatus; wrapping the media encryption key to generate an encrypted media encryption key; storing the encrypted media encryption key in a non-volatile memory of the apparatus; and transitioning the apparatus to and from a secure state using the encrypted media encryption key.

An example method 2 can include elements of example method 1, wherein the apparatus is a four state apparatus, the four states being an unowned state, a secure_unlocked state, a secure_locked state, and an unsecure state.

An example method 3 can include elements of any preceding example method, wherein the example method includes: generating an erase key; wrapping the erase key to form a wrapped erase key; and sending the wrapped erase key to the non-volatile memory.

An example method 4 can include elements of any preceding example method, wherein the example method includes: receiving an access key or an erase key for an operation that transitions from the secure_locked state; and performing the operation using the access key or the erase key for the operation based on a successful unwrapping operation on the encrypted media encryption key or the wrapped erase key with respect to the respective received access key or received erase key for the operation.

An example method 5 comprises: generating a media encryption key, the media encryption key to encrypt data in a number of volatile memory components of a non-volatile dual in-line memory module, the non-volatile dual in-line memory module having a non-volatile controller; receiving an access key originating from a host device; generating a media key encryption key using the access key; wrapping the combination of the media encryption key and the media key encryption key, forming an encrypted media encryption key; storing the encrypted media encryption key in a non-volatile memory of the non-volatile dual in-line memory module; and transitioning from a secure state of the non-volatile controller using the encrypted media encryption key.

An example method 6 can include elements of example method 5 and elements of any preceding example method, wherein the non-volatile controller is operated as a four state device, the four states being a unowned state, a secure_unlocked state, a secure_locked state, and a unsecure state.

An example method 7 can include elements of any preceding example method, wherein the example method includes: receiving an access key from a host device; using the access key to unlock the non-volatile controller or rotate to another access key; and executing the unlocking of the non-volatile controller or the rotating to another access based on a successful unwrapping of the encrypted media encryption key with respect to the received access key.

An example method 8 can include elements of any preceding example method, wherein the example method includes: generating an erase key; wrapping the erase key to form a wrapped erase key; and sending the wrapped erase key to the non-volatile memory.

An example method 9 can include elements of any preceding example method, wherein the example method includes: receiving an erase key from a host device; using the erase key to unsecure the non-volatile controller or change a key in the non-volatile memory; and executing the unsecuring of the non-volatile controller or the changing of the key based on a successful unwrapping of the wrapped erase key with respect to the received erase key.

An example method 10 can include elements of any preceding example method with respect to elements of any preceding example system, elements of any preceding example apparatus, and any preceding example non-volatile dual in-line memory module.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
   a plurality of memory components;
   an encryption key generator comprising:
      a random number generator configured to generate a first random number as a salt, and to generate a second random number as a media encryption key to encrypt data in the plurality of memory components;
      an encryption block configured to generate a media key encrypted key by using a first encryption algorithm, the salt, and an access key received from a host device, wherein generating the media key encrypted key comprises concatenating the salt onto the access key; and
      a wrapping block configured to generate an encrypted media encryption key by wrapping the media encryption key using a second encryption algorithm and the media key encrypted key; and
   a processing device configured to transition the memory system to and from a secure state using the encrypted media encryption key, the secure state determining access to the data in the plurality of memory components by the host device, wherein the secure state is selected from a plurality of states, wherein the plurality of states comprises a secure locked state that makes the data in the plurality of memory components inaccessible, and wherein transitioning the memory system to and from the secure state using the encrypted media encryption key comprises:
   unwrapping the encrypted media encryption key using the second encryption algorithm; and
   transitioning from the secure locked state to a secure unlocked state using the unwrapped encrypted media encryption key.

2. The memory system of claim 1, comprising:
   a non-volatile memory configured to store the encrypted media encryption key.

3. The memory system of claim 2, wherein the processing device is configured to control access to the non-volatile memory.

4. The memory system of claim 1, wherein the plurality of states comprises an unowned state, a secure unlocked state, the secure locked state, and an unsecure state.

5. The memory system of claim 1, wherein the encryption block is configured to generate an erase key, and wherein the wrapping block is configured to generate a wrapped erase key by wrapping the erase key using the second encryption algorithm.

6. The memory system of claim 5, wherein transitioning the memory system to and from the secure state using the encrypted media encryption key comprises:
   unwrapping the wrapped erase key using the second encryption algorithm; and
   transitioning from the secure locked state to a secure unlocked state using the erase key from the unwrapping of the wrapped erase key.

7. The memory system of claim 6, comprising:
   a non-volatile memory configured to store the wrapped erase key.

8. The memory system of claim 7, wherein the processing device is configured to control access to the non-volatile memory.

9. The memory system of claim 1, wherein the processing device is configured to execute an application program interface call that sets up a data path to hardware for one or more other application program interface calls.

10. A method comprising:
    receiving, from a host device, an access key;
    causing, by a processing device of a memory system, a random number generator to generate a first random number as a salt;
    causing, by the processing device, the random number generator to generate a second random number as a media encryption key to encrypt data in a plurality of memory components of the memory system;
    causing, by the processing device, an encryption block to generate a media key encrypted key by using a first encryption algorithm, the salt, and the access key from the host device, wherein generating the media key encrypted key comprises concatenating the salt onto the access key;
    causing, by the processing device, a wrapping block to generate an encrypted media encryption key by wrapping the media encryption key using a second encryption algorithm and the media key encrypted key; and
    causing, by the processing device, the memory system to transition to and from a secure state using the encrypted media encryption key, the secure state determining access to the data in the plurality of memory components by the host device, wherein the secure state is selected from a plurality of states, wherein the plurality of states comprises a secure locked state that makes the data in the plurality of memory components inaccessible, and wherein transitioning the memory system to and from the secure state using the encrypted media encryption key comprises:
unwrapping the wrapped erase key using the second encryption algorithm; and
transitioning from the secure locked state to a secure unlocked state using the erase key from the unwrapping of the wrapped erase key.

11. The method of claim 10, comprising:
causing, by the processing device, storage of the encrypted media encryption key on a non-volatile memory of the memory system.

12. The method of claim 11, comprising:
controlling, by the processing device, access to the non-volatile memory.

13. The method of claim 10, wherein the plurality of states comprises an unowned state, a secure unlocked state, the secure locked state, and an unsecure state.

14. The method of claim 10, wherein transitioning the memory system to and from the secure state using the encrypted media encryption key comprises:
unwrapping the encrypted media encryption key using the second encryption algorithm; and
transitioning from the secure locked state to a secure unlocked state using the unwrapped encrypted media encryption key.

15. The method of claim 10, comprising:
causing, by the processing device, the encryption block to generate an erase key; and
causing, by the processing device, the wrapping block to generate a wrapped erase key by wrapping the erase key using the second encryption algorithm.

16. The method of claim 10, comprising:
causing, by the processing device, storage of the wrapped erase key on a non-volatile memory of the memory system.

17. The method of claim 16, comprising:
controlling, by the processing device, access to the non-volatile memory.

18. A non-volatile dual in-line memory module comprising:
a plurality of volatile memory components;
a first non-volatile memory in which to dump contents of the plurality of volatile memory components upon detection of a power failure;
an encryption key generator comprising:
a random number generator configured to generate a first random number as a salt, and to generate a second random number as a media encryption key to encrypt data in a plurality of memory components;
an encryption block configured to generate a media key encrypted key by using a first encryption algorithm, the salt, and an access key received from a host device, wherein generating the media key encrypted key comprises concatenating the salt onto the access key; and
a wrapping block configured to generate an encrypted media encryption key by wrapping the media encryption key using a second encryption algorithm and the media key encrypted key;
a second non-volatile memory configured to store the encrypted media encryption key; and
a processing device configured to transition the non-volatile dual in-line memory module to and from a secure state using the encrypted media encryption key, the secure state determining access to the data in the plurality of memory components by the host device, wherein the secure state is selected from a plurality of states, wherein the plurality of states comprises a secure locked state that makes the data in the plurality of volatile memory components inaccessible, and wherein transitioning the memory system to and from the secure state using the encrypted media encryption key comprises:
unwrapping the wrapped erase key using the second encryption algorithm; and
transitioning from the secure locked state to a secure unlocked state using the erase key from the unwrapping of the wrapped erase key.

* * * * *